Figure 1:
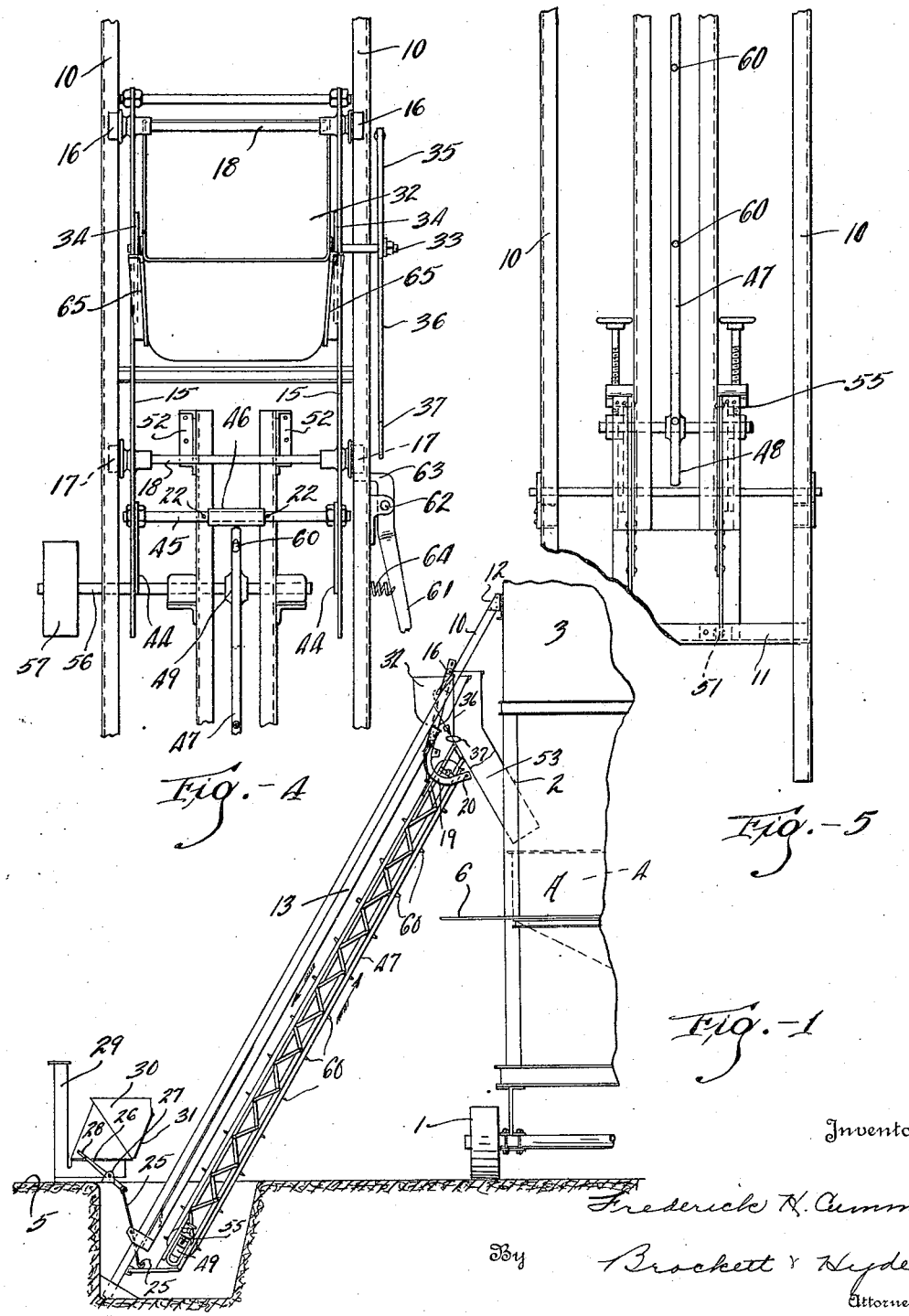

July 16, 1929.  F. H. CUMMER  1,721,206
DUST CHARGER FOR ROAD PLANTS
Filed Nov. 5, 1926  3 Sheets-Sheet 3

Inventor
Frederick H. Cummer
By Brockett & Hyde
Attorneys

Patented July 16, 1929.

1,721,206

UNITED STATES PATENT OFFICE.

FREDERICK H. CUMMER, OF LOS ANGELES, CALIFORNIA.

DUST CHARGER FOR ROAD PLANTS.

Application filed November 5, 1926. Serial No. 146,446.

This invention relates to charging apparatus for use in connection with road plants, such as plants for the preparation of asphalt or like road mixtures.

Such mixtures usually require a certain proportion of dust or very fine material which is usually handled in bags and ordinarily must be lifted by hand and dumped into the mixer, which is located at a fairly high elevation from the ground, and furthermore require very accurate proportioning of the various ingredients of which they are compounded. Owing to the prevailing strict specifications for road construction the continual presence of at least one responsible weighing operator is required upon the small elevated platform at the mixer whose duty it is to insure a proper feeding of the measured ingredients into the mixer. It is obviously of great advantage to operate such a plant at the utmost speed, often involving a mixer loading cycle completed in less than one minute and resulting in a great burden upon the weigher.

One object of the present invention is, therefore, to provide simple apparatus for pre-weighing a proper charge of fine dust or like material, and elevating the same by power to a position where the load is held awaiting delivery into the mixer, the weighing and elevating being controllable by an operator at the lower or ground level, and the delivery of the charge to the mixer and the return of the container to ground level being controlled by the platform operator, thereby reducing the labor, avoiding congestion and speeding up the entire operation.

A further object of the invention is to provide apparatus of this kind which is of simple form and is more or less a self-contained unit capable of connection to the plant or separation therefrom at will when necessary, as when the plant is moved from one location to another, and which apparatus is also so arranged as to enable it to be readily driven by a power connection to the mixing plant.

A further object of the invention is to provide an elevator for the purpose described employing an operating member adapted for continued movement, such as an endless belt and chain, together with a skip or carriage movable up and down along tracks and capable at will of being connected to the operating member for movement in either direction, up or down; the parts being so arranged as to automatically disconnect the carriage from the operating member upon its arrival at either of the two extremes of movement.

Further objects of the invention are to provide a simple and improved mechanism for the purpose described, which is of rugged and durable form, which is capable of convenient control by the operators thereof and which is not likely to get out of order in service. Still further objects of the invention are in part obvious and in part will appear more in detail hereinafter.

Figure 2:
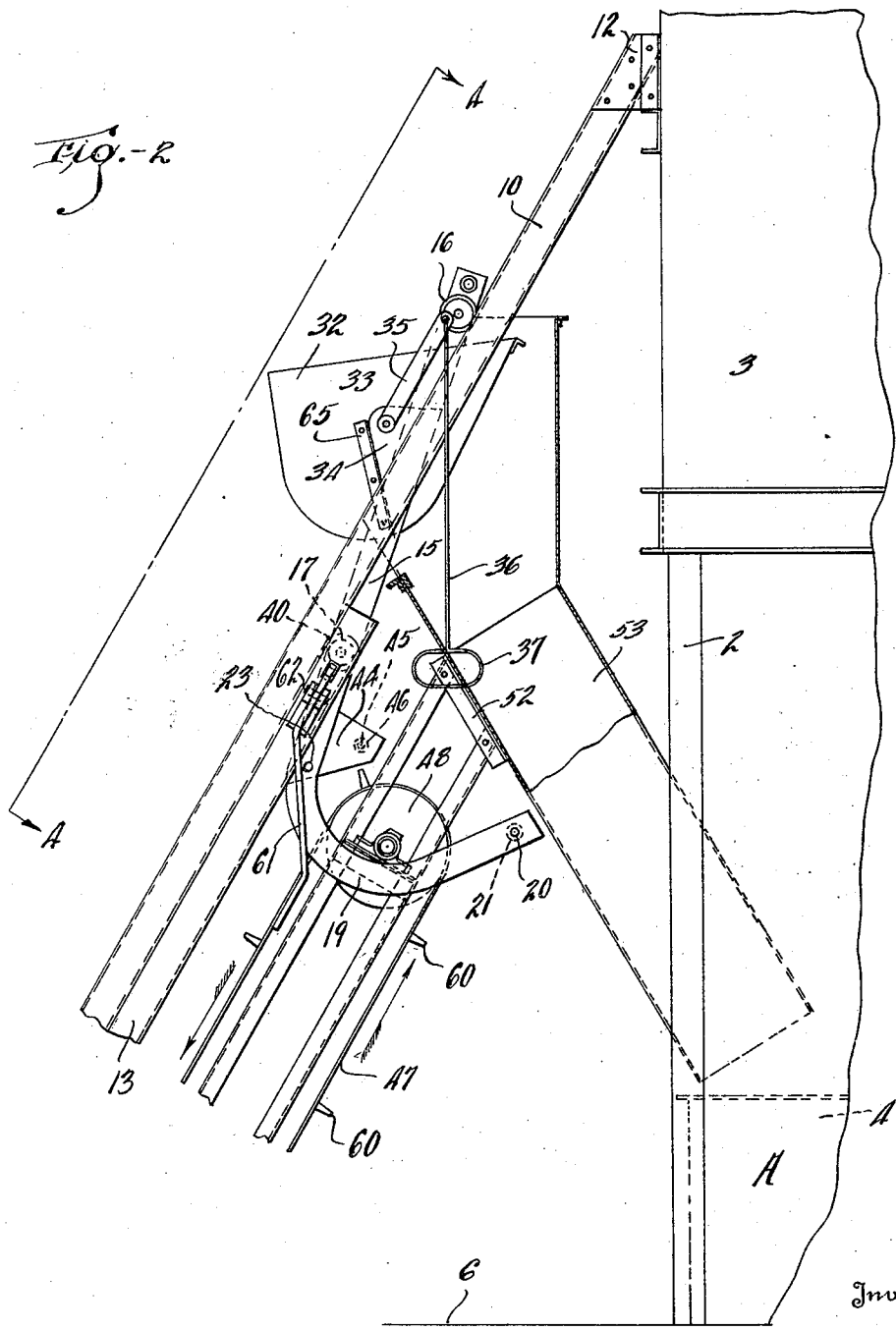
Figure 3:
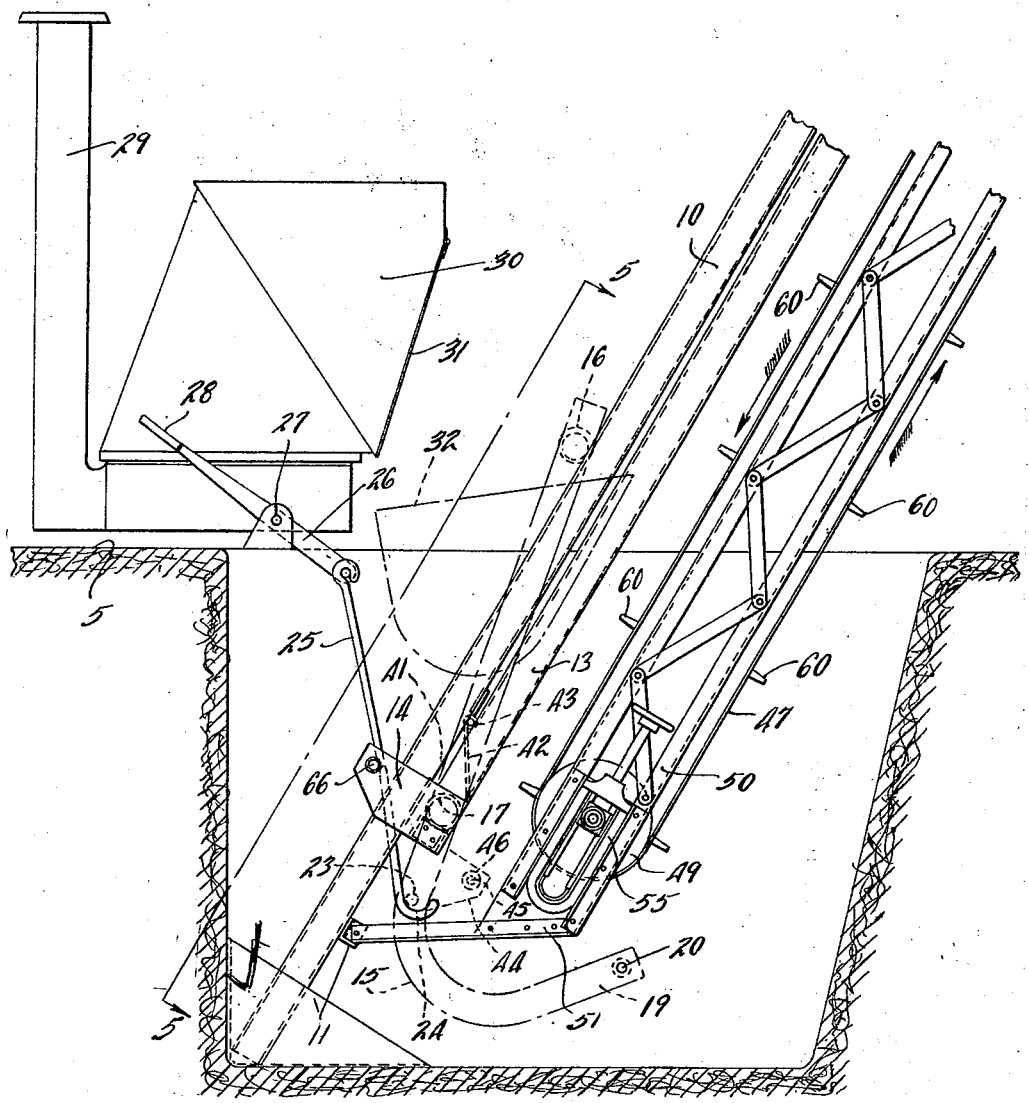

In the drawings which represent one suitable embodiment of the invention, Fig. 1 is an end elevation of an asphalt mixing plant with my improved dust charger more or less conventionally shown at one side thereof; Fig. 2 is a detail end elevation of the mechanism at the upper end of the hoist; Fig. 3 is a similar view of the mechanism at the lower end of the hoist; Figs. 4 and 5 are views taken along the lines 4—4 and 5—5 of the parts shown in Figs. 2 and 3 respectively.

Referring to the drawings an asphalt plant of typical arrangement is shown indicated at "A," but this may be of any suitable or desired form and arrangement. It is a large heavy machine provided with support wheels 1 to carry the frame 2, which over all may be 18 or more feet high, and upon which are supported suitable bins 3 from which the crushed rock or other material is delivered to a mechanical mixer 4 to which also is supplied from a suitable source the asphalt or other plastic material, all under the control of a weigher standing upon an elevated platform 6. The present invention relates to apparatus for elevating the fine dust from the level of the ground at 5 and delivering the same to a position to be dumped into the mixer 4.

To accommodate my invention a pit may be provided alongside the mixer plant, as indicated in Figs. 1 and 3.

The elevating mechanism illustrated comprises a suitable frame, shown as including a pair of parallel channel members 10 with their flanges extending toward each other and cross-connected by braces 11, the upper ends of said frame being suitably arranged for detachable connection to the plant frame, as by a bolted connection at 12, a suitable footing at the bottom of the frame being afforded by the arrangement shown. These two channels form the upper tracks for the carriage, the lower tracks comprising a pair of like channels 13 lying below the frame channels and suitably connected thereto, as by plates 14.

The skip or carriage comprises two parallel open side bars 15 provided with a pair of upper flanged rollers 16 travelling on the upper flanges of the track channels 10, and a pair of lower flanged rollers 17 travelling first between the flanges of the upper tracks 10 and then between the flanges of the lower tracks 13 as will appear. The two side bars are connected by several cross rods, as at 18, which may also serve as shafts for the flange rollers. At their lower ends, beyond the curve 19 the side members are connected by a cross rod 20, which, intermediate its ends, may have loosely sleeved to rotate thereon a piece of pipe or tubing 21, turning between two cross pins 22 and which serves as an anti-friction member as will appear.

At the lower end of their straight portions each side member is provided with an outwardly projecting pin 23 to cooperate with a hook 24 at the lower end of a bar 25, there being two such bars, one on each side of a frame, said bars being connected to arms 26 pivoted at 27 on a stationary support at the ground level, said arms being provided with manually operable means such as a foot bar 28 lying adjacent platform scale 29 on which is mounted a small bin or receptacle 30 having a hinged door 31 arranged to deliver a load unit deposited and weighed in said receptacle into the bucket 32 when the latter is in its lower position as in Fig. 3.

Said bucket is pivoted on the axis 33, being provided for that purpose with side trunnions entering openings in plates 34 carried by the skip frame, one of said trunnions extending out at one side of the frame in the form of a shaft to which is fixed an arm 35 provided with suitable means for its operation to tilt the bucket; for which purpose said arm may be provided with an opening in its end to receive the hooked end of a pull rod 36, provided at its lower end with a handle 37. Said pull rod may be looped permanently through said opening so as to travel up and down with the bucket. The length of the rod 36 is such that when the bucket is in the position of Fig. 2 the handle 37 is convenient to the operator upon the mixer platform 66.

The tracks 10, 13 are provided with crossovers at their upper and lower ends, that at the upper end comprising simple gaps or recesses in the adjacent flanges of the tracks, as indicated at 40, and at the lower end comprising a similar gap 41 together with track flaps 42 pivoted at 43 and lying within the track channels. The side bars of the carriage frame are also provided with flaps 44 connected by a cross rod 45 which may also be provided with an anti-friction roller sleeve 46 similar to the sleeve 21.

The movable operating member for the carriage is an endless belt or chain, marked 47, and travelling over upper and lower sprocket wheels 48, 49 fixed on shafts suitably journalled in the reduced or skeleton frame 50 supported by braces 51 connected to the channels 10 and at its upper end by rigid connection at 52 to a chute 53, the lower end of which lies above the mixer 4 and the upper end of which is of receiving hopper form and is riveted or bolted to the frame channels 10. The lower sprocket shaft may be provided with suitable means generally indicated at 55 for adjusting the tension of the chain while the upper sprocket shaft may be continued beyond one side of the frame as at 56 which may be provided with suitable means for operating it such as a belt pulley 57.

The operation is as follows:

Let us assume that the carriage occupies its lowermost position as indicated at Fig. 3. The operator upon the ground level, who may be more or less unskilled, weighs a charge of fine dust or other material in the receptacle 30 and by releasing the door 31 allows the charge to drop into the bucket 32. Assuming that shaft 56 is being constantly rotated by the driving belt so that the chain 47 travels as indicated by the arrows, the operator upon the ground level thereupon depresses the foot plate 28 which, by its connection with the pins 23 lifts the entire carriage and bucket, causing the upper rollers 16 to travel upwardly along the upper flanges of channel 10, and the lower rollers 17 to travel up the track flaps 42 and into the trackway between the flanges of the upper channel 10. Such movement brings the sleeve roller on rod 20 into the path of movement of one of a series of teeth 60 on chain 47, so that the chain thereupon assumes the weight of the carriage and bucket and rolls the same upwardly along the tracks until the lower track rollers 17 drop through the gaps 40.

At one side of the frame is mounted a hand lever 61 pivoted at 62 and having a tooth 63 passing through the web of the lower channel member, said lever being normally yieldingly held in the position shown in Fig. 4 as by the spring 64. When the lower track rollers drop through the gap 40, one thereof engages the tooth of the lever 61 so that the carriage is held or stopped in the position shown in Fig. 2, with the weighed charge held in position to be dumped or delivered to the mixer. The entrance of rollers 17 into the lower trackway swings the lower part of the carriage to the right, Fig. 2, and moves the rod 20 out of the path of movement of the lower portion of the flexible chain.

The operator upon the mixer platform now at his convenience pulls down on the dump rod 36, tilting the bucket and discharging its contents into the hopper from which they flow by way of the chute 53 to the mixer. After the bucket is emptied it returns by gravity to the position shown in which it is stopped in any suitable manner such as by stop angle plates 65 riveted on the sides of the bucket and adapted to engage the plates 34.

The operator upon the platform next presses the lever 61 to withdraw its hooked end from beneath the roller 17, permitting the carriage to slide down along the track. The rod 45 is now in the path of movement of the chain teeth 60 as they travel downwardly over the upper sprocket, so that one of said teeth accepts the weight of the carriage and bucket and permits the same to travel downwardly along the tracks to the position shown in Fig. 3, in which position the pins 23 rest in the hooks 24 which in turn are supported against the cross rod 66 on the stationary frame; the bucket being then in position to receive another load preparatory to carrying it upwardly.

With this arrangement elevating movement is initiated by the ground level operator by pressing the foot plate 28, and lowering movement by the platform operator by operating the stop lever 61, the upper and lower parts of the chain taking care of movement of the carriage, which is automatically disconnected from the chain at either extremity of its travel.

Thus by incorporating my invention in a plant as described, the labor heretofore required in lifting the dust bags to the mixer elevation is diverted to merely loading the scale supported bin at approximately ground level; the duties of the highly paid operator on the mixer platform are lightened; congestion of operators on the platform relieved; and a greater speed of mixer operation is made possible.

What I claim is:

1. In a mixing plant, an elevated receptacle, and means for loading material into said receptacle, comprising a frame detachably secured to said plant and extending downwards from a position adjacent said receptacle, tracks in said frame, a carriage provided with followers movable along said tracks, a bucket mounted on said carriage and movable therewith to a position to dump into said receptacle, an endless operating member adapted for continuous movement along said frame, coupling members upon said carriage adapted for engagement selectively with upwardly and downwardly moving portions of said operating member to effect corresponding movement of said carriage, means upon said tracks for transferring one of said followers from one track to the other at each extremity of travel of said carriage, one of said coupling members being positioned by said transfer means in proper alignment with an alternate one of said operating member portions to engage with same, means for advancing said carriage to effect said engagement, means for retaining said carriage at the opposite extremity of travel thereof, and means to dump the contents of said bucket into said receptacle.

2. In a mixing plant, an elevated receptacle, and means for loading material into said receptacle, comprising a frame detachably secured to said plant and extending downwards from a position adjacent said receptacle, tracks in said frame, a carriage provided with followers movable along said tracks, a bucket mounted on said carriage and movable therewith between a position below the ground level and a position to dump into said receptacle, an endless operating member adapted for continuous movement along said frame, coupling members upon said carriage adapted for engagement selectively with upwardly and downwardly moving portions of said operating member to effect corresponding movement of said carriage, means upon said tracks for transferring one of said followers from one track to the other at each extremity of travel of said carriage, one of said coupling members being positioned by said transfer means in proper alignment with an alternate one of said operating member portions to engage with same, means for advancing said carriage to effect said engagement, means for retaining said carriage at the opposite extremity of travel thereof, and means to dump the contents of said bucket into said receptacle.

3. In a mixing plant, an elevated receptacle, and means for loading material into said receptacle, comprising a frame detachably secured to said plant and extending downwardly from a position adjacent said receptacle, flanged track members in said frame, a carriage provided with followers movable along said track member between the flanges thereof, a bucket mounted on said carriage and movable therewith between a position below the ground level and a position to dump into said receptacle, an endless operating member adapted for continuous movement along said frame, coupling members upon said carriage adapted for engagement selectively with upwardly and downwardly moving portions of said operating member to effect corresponding movement of said carriage, the flanges of said track members being provided with openings, means associated therewith for automatically transferring one of said followers from one track to the other at each extremity of travel of said carriage, one of said coupling members being positioned by said transfer means in proper alignment with an alternate one of said operating member portions to engage with same, manually operable means for advancing said carriage from one of said extremities to effect said engagement, means for retaining said carriage at the opposite extremity clear of said operating member, and means to dump the contents of said bucket into said receptacle.

4. In a mixing plant, an elevated receptacle, and means for loading material into said receptacle, comprising a frame detachably secured to said plant and extending downwardly from a position adjacent said receptacle, flanged track members in said frame, a carriage provided with followers movable along said track members between the flanges thereof, a bucket mounted on said carriage and movable therewith between a position below the ground level and a position to dump into said receptacle, an endless operating member adapted for continuous movement along said frame, coupling members upon said carriage adapted for engagement selectively with upwardly and downwardly moving portions of said operating member to effect corresponding movement of said carriage, the flanges of said track members being provided with openings, means associated therewith for automatically transferring one of said followers from one track to the other at each extremity of travel of said carriage, one of said coupling members being positioned by said transfer means in proper alignment with an alternate one of said operating member portions to engage with same, manually operable means for advancing said carriage from one of said extremities to effect said engagement, means for retaining said carriage at the opposite extremity clear of said operating member, and means to dump the contents of said bucket into said receptacle, the means for advancing said carriage to initiate raising of said bucket being operable from the ground level, and the corresponding means for lowering said bucket and for dumping the same being operable from the level of said receptacle.

5. A road plant provided with an elevated platform and a mixer adjacent thereto for receiving the road mix, means whereby crushed rock may be supplied to said mixer, and fine dust charging means for said mixer, comprising a frame adapted for attachment to the plant frame and extending downwardly from a level near the platform to a level near the ground, a dumping container movable thereon from ground level to a platform position where it discharges to the mixer, traversing means for said container, controlling means operatable at ground level for causing the container to rise, and additional controlling means operatable at platform level for causing the container to descend.

6. A road plant provided with an elevated platform and a mixer adjacent thereto for receiving a road mix, means whereby crushed rock may be supplied to said mixer, and fine dust charging means for said mixer, comprising a frame adapted for attachment to the plant frame and extending downwardly from a level near the platform to a level near the ground, a dumping container movable thereon from ground level to a platform position where it discharges to the mixer, traversing means for said container, controlling means operatable at ground level for causing the container to rise, means operatable at platform level for dumping said container, and additional controlling means operatable at platform level for causing the container to descend.

7. A road plant provided with an elevated platform and a mixer adjacent thereto for receiving a road mix, means whereby crushed rock may be supplied to said mixer, and fine dust charging means for said mixer, comprising a frame adapted for attachment to the plant frame and extending downwardly from a level near the platform to a level near the ground, a dumping container movable thereon from ground level to a platform position where it discharges to the mixer, traversing means for said container, means located and operable at ground level for delivering a weighed charge to said container, controlling means operatable at ground level for causing the container to rise, means operatable at platform level for dumping said container, and additional controlling means operatable at platform level for causing the container to descend.

In testimony whereof I hereby affix my signature.

FREDERICK H. CUMMER.